(12) United States Patent
Xu et al.

(10) Patent No.: US 11,350,302 B2
(45) Date of Patent: May 31, 2022

(54) METHOD, APPARATUS AND DEVICE FOR MANAGING THRESHOLD PAIR CHANGE

(71) Applicant: China Academy of Telecommunications Technology, Beijing (CN)

(72) Inventors: Meng Xu, Beijing (CN); Jing Liang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/968,169

(22) PCT Filed: Dec. 7, 2018

(86) PCT No.: PCT/CN2018/119890
§ 371 (c)(1),
(2) Date: Aug. 7, 2020

(87) PCT Pub. No.: WO2019/153866
PCT Pub. Date: Aug. 15, 2019

(65) Prior Publication Data
US 2021/0006998 A1    Jan. 7, 2021

(30) Foreign Application Priority Data
Feb. 9, 2018 (CN) .......................... 201810136941.6

(51) Int. Cl.
*H04W 24/10* (2009.01)
*H04B 17/309* (2015.01)
*H04L 1/20* (2006.01)

(52) U.S. Cl.
CPC .......... *H04W 24/10* (2013.01); *H04B 17/309* (2015.01); *H04L 1/203* (2013.01)

(58) Field of Classification Search
CPC ... H04L 25/0224; H04L 1/203; H04L 5/0048; H04W 76/27; H04W 24/08; H04W 24/10;
(Continued)

(56) References Cited

U.S. PATENT DOCUMENTS 10,200,895 B2 * 2/2019 Kaikkonen ........... H04W 24/10
10,333,683 B2 * 6/2019 Palenius ............... H04W 24/08
(Continued)

FOREIGN PATENT DOCUMENTS

| CN | 101309493 A | 11/2008 |
|---|---|---|
| CN | 103384382 A | 11/2013 |

(Continued)

OTHER PUBLICATIONS

Huawei et al., "Remaining details on Radio link monitoring In NR", 3GPP TSG RAN WG1 Meeting #90bis, Prague, Czech Republic, Oct. 9-13, 2017, total 4 pages, R1-1717055.
(Continued)

*Primary Examiner* — Hanh N Nguyen
(74) *Attorney, Agent, or Firm* — Kilpatrick Townsend & Stockton, LLP (57) ABSTRACT

Disclosed are a method, apparatus and device for managing a threshold pair change. The method comprises: determining a radio link monitor reference signal In Sync indication/Out Of Sync indication monitoring threshold; and when the radio link monitor reference signal In Sync indication/Out-Of Sync indication monitoring threshold changes, respectively managing, in conjunction with the state of a current radio link failure timer and according to the change of an In Sync indication/Out-Of Sync indication threshold pair, an In Sync indication counter, an Out-Of Sync indication counter, and a timer related to a radio link failure. By means of the present application, the channel quality under a new channel quality requirement can be more accurately reflected, so that (Continued)

a radio link failure state can be determined more accurately according to the current channel quality requirement.

15 Claims, 2 Drawing Sheets (58) Field of Classification Search
CPC ... H04W 56/001; H04W 56/00; H04W 56/04; H04W 76/18; H04W 56/004; H04B 17/309; H04B 7/0626
See application file for complete search history.

(56) References Cited

U.S. PATENT DOCUMENTS

| | | | |
|---|---|---|---|
| 10,686,573 B2* | 6/2020 | Jung | H04L 5/0023 |
| 10,827,426 B2* | 11/2020 | Yilmaz | H04W 76/19 |
| 2012/0115529 A1 | 5/2012 | Sun | |
| 2013/0252606 A1 | 9/2013 | Nimbalker et al. | |
| 2014/0098761 A1 | 4/2014 | Lee et al. | |
| 2017/0208494 A1* | 7/2017 | Moon | H04L 5/0048 |
| 2019/0052377 A1* | 2/2019 | Hwang | H04W 56/0015 |
| 2020/0059404 A1* | 2/2020 | Liu | H04W 76/27 |
| 2020/0076556 A1* | 3/2020 | Takahashi | H04L 5/0053 |

FOREIGN PATENT DOCUMENTS

| | | |
|---|---|---|
| CN | 103826247 A | 5/2014 |
| CN | 106851697 A | 6/2017 |
| WO | 2017189243 A1 | 11/2017 |
| WO | 2019140627 A1 | 7/2019 |

OTHER PUBLICATIONS

Spreadtrum Communications, "Discussions on the IS and OOS counting procedure", 3GPP TSG-RAN WG2#100, Reno, USA, Nov. 2-Dec. 1, 2017, total 5 pages, R2-1712276.
AT&T, "Configuration of IS/OOS BLER Thresholds for RLM", 3GPP TSG-RAN WG2 #99bis, Prague, Czech Republic, Oct. 9-13, 2017, total 2 pages, R2-1711676.
Intel Corporation, "Summary of Discussion for NR Radio Link Monitoring", 3GPP TSG RAN WG1 Meeting #90bis, Prague, Czech Republic, Oct. 9-13, 2017, total 7 pages, R1-1718794.

* cited by examiner

METHOD, APPARATUS AND DEVICE FOR MANAGING THRESHOLD PAIR CHANGE

CROSS REFERENCE TO RELATED APPLICATIONS

This application is a National Stage of International Application No. PCT/CN2018/119890, filed on Dec. 7, 2018, which claims priority of Chinese Patent Application No. 201810136941.6, filed with Chinese Patent Office on Feb. 9, 2018, entitled "Method, Apparatus and Device for Managing Threshold Pair Change", the entire contents of which are incorporated herein by reference.

FIELD

The present application relates to the field of wireless communication technology, and in particular relates to a method, apparatus and device for managing threshold pair change.

BACKGROUND

In a long term evolution (LTE) system, there is only one In-Sync and Out-Of-Sync threshold pair, that is, an In-Sync threshold value Qin and an Out-Of-Sync threshold value Qout. The threshold pair respectively corresponds to block error ratios (BLERs) of [2%, 10%]. A physical layer of user equipment (UE) periodically evaluates a configured radio link monitor (RLM) measuring reference signal. When the radio link quality of an RLM resource reference signal is lower than a configured Out-Of-Sync threshold value Qout, the physical layer indicates an Out-Of-Sync indication to a radio resource control (RRC); and when the radio link quality of the RLM resource reference signal is higher than a configured In-Sync threshold value Qin, the physical layer indicates an In-Sync threshold indication to the RRC.

When the RRC has consecutively received N310 Out-Of-Sync indications, an RRC layer turns on a timer T310 to perform radio link failure detection. Before timeout of the T310, after the RRC layer has consecutively received N311 In-Sync indications, the RRC layer turns off the timer T310, and a link is considered to have recovered to normal. Before timeout of the T310, if the RRC layer has not consecutively received N311 In-Sync indications, the RRC layer determines a link failure when the T310 expires.

A new radio access technology (NR) system uses a method for determining a link failure by reporting In-Sync indications and Out-Of-Sync indications as in an LTE system, but unlike the LTE system, the NR system has two In-Sync/Out-Of-Sync (IS/OOS) BLER threshold pairs. At an initial access of the UE to a network side, a default IS/OOS threshold pair may be used to detect the link quality, and the network side may reconfigure the IS/OOS BLER threshold pair for the UE at any time according to a UE service type.

The prior art has the following drawbacks.

In the NR system, the network side may configure different IS/OOS threshold pairs for the UE. When the IS/OOS threshold pair changes, if a current RLM counter and timer cannot correctly reflect the signal quality under a new channel quality requirement criterion, further, there is no solution for solving the problem of how to manage a RLM-related counter (In-Sync counter, Out-Of-Sync counter) and related timer at the UE side when the RLM IS/OOS threshold pair changes.

SUMMARY

The present application provides a method, apparatus and device for managing a threshold pair change, to solve the problem that in a current NR system, when an RLM monitoring threshold changes, a current RLM counter and timer cannot correctly reflect the signal quality under a new channel quality requirement criterion.

An embodiment of the present application provides a method for managing threshold pair change, including:

determining, by a UE, an RLM reference signal IS/OOS monitoring threshold; and in response to that the RLM reference signal IS/OOS monitoring threshold is reconfigured, managing, by the UE, an IS counter, an OOS counter, and an RLF timer respectively, based on a current state of the RLF timer and a reconfiguration of of an IS/OOS threshold pair.

In some embodiments, the change of the IS/OOS threshold pair refers to that the IS/OOS threshold pair is reconfigured from a low threshold pair to a high threshold pair, or the IS/OOS threshold pair is reconfigured from a high threshold pair to a low threshold pair, wherein a threshold pair with a stricter channel quality requirement criterion is the high threshold pair, and a threshold pair with a lower channel quality requirement criterion is the low threshold pair.

In some embodiments, in a case where the RLF timer is not running, when the IS/OOS threshold pair is reconfigured from a low threshold pair to a high threshold pair, the IS counter, the OOS counter, and the RLF timer are managed by one of the following modes:

mode 1: retaining the OOS counter, and continuing counting a first value of the OOS counter by using a reconfigured threshold pair criterion based on a value retained on the counter;

mode 2: resetting the OOS counter to zero, and counting a second value of the OOS counter by using a reconfigured threshold pair criterion;

mode 3: clearing the OOS counter and starting the RLF timer;

mode 4: rounding a first preset proportional value of a first current value of the OOS counter to obtain a first new value of the OOS counter; when the first new value of the OOS counter is greater than a first preset value, starting the RLF timer and clearing the OOS counter; when the first new value of the OOS counter is not greater than the first preset value, counting a third value of the OOS counter by using a reconfigured threshold pair criterion based on the first new value of the OOS counter, wherein the first preset proportional value is a value greater than 1;

mode 5: adding a second preset value to a second current value of the OOS counter to obtain a second new value of the OOS counter; when the second new value of the OOS counter is greater than a third preset value, starting the RLF timer; when the second new value of the OOS counter is not greater than the third preset value, counting a fourth value of the OOS counter by using a reconfigured threshold pair criterion based on the second new value of the OOS counter; and mode 6: when a current value of the OOS counter is higher than a first preset threshold value, starting the RLF timer, and when the current value of the OOS counter is lower than the first preset threshold value, using any one of the modes 1, 2, 4 and 5 to obtain a value of the OOS counter, and counting a fifth value of the OOS counter by using a reconfigured threshold pair criterion based on the value.

In some embodiments, in a case where the RLF timer is not running, when the IS/OOS threshold pair is reconfigured from a high threshold pair to a low threshold pair, the IS counter, the OOS counter, and the RLF timer are managed by one of the following modes:

mode 1: resetting the OOS counter to zero, and counting a sixth value of the OOS counter by using a reconfigured threshold pair criterion;

mode 2: retaining the OOS counter, and counting a seventh value of the OOS counter by using a reconfigured threshold pair criterion based on a value retained on the counter;

mode 3: rounding a second preset proportional value of a current value of the OOS counter to obtain a new value of the OOS counter, and counting an eighth value of the OOS counter by using a reconfigured threshold pair criterion based on the new value of the OOS counter, wherein the second preset proportional value is a value between 0 and 1; and mode 4: reducing a fourth preset value from a current value of the OOS counter to obtain a new value of the OOS counter, and performing counting a ninth value of the OOS counter by using a reconfigured threshold pair criterion based on the new value of the OOS counter.

In some embodiments, in a case where the RLF timer is running, when the IS/OOS threshold pair is reconfigured from a low threshold pair to a high threshold pair, the IS counter, the OOS counter, and the RLF timer are managed by one of the following modes:

mode 1: retaining the IS counter, and counting a tenth value of the OOS counter by using a reconfigured threshold pair criterion based on a value retained on the counter;

mode 2: retaining the IS counter, counting an eleventh value of the OOS counter by using a reconfigured threshold pair criterion, and shortening the RLF timer;

mode 3: resetting the IS counter to zero, and counting a twelfth value of the OOS counter by using a reconfigured threshold pair criterion;

mode 4: resetting the IS counter to zero, and stopping the RLF timer;

mode 5: resetting the IS counter to zero, and restarting or extending the RLF timer;

mode 6: rounding a third preset proportional value of a current value of the IS counter to obtain a new value of the IS counter, and counting a thirteenth value of the OOS counter by using a reconfigured threshold pair criterion based on the new value of the IS counter, wherein the third preset proportional value is a value between 0 and 1; and mode 7: reducing a fifth preset value from a current value of the IS counter to obtain a new value of the IS counter, and counting a fourteenth value of the OOS counter by using a reconfigured threshold pair criterion based on the new value of the IS counter.

In some embodiments, in a case where the RLF timer is running, when the IS/OOS threshold pair is reconfigured from a high threshold pair to a low threshold pair, the IS counter, the OOS counter, and the RLF timer are managed by one of the following modes:

mode 1: retaining the IS counter, and counting a fifteenth value of the OOS counter by using a reconfigured threshold pair criterion based on a value retained on the counter;

mode 2: retaining the IS counter, counting a sixteenth value of the OOS counter by using a reconfigured threshold pair criterion, and restarting or extending the RLF timer;

mode 3: resetting the IS counter to zero, and restarting or extending the RLF timer;

mode 4: resetting the IS counter to zero, and stopping the RLF timer;

mode 5: resetting the IS counter to zero, and counting a seventeenth value of the OOS counter by using a reconfigured threshold pair criterion;

mode 6: using a fourth preset proportional value of a current value of the IS counter as a new value of the IS counter; when the new value of the IS counter is greater than a sixth preset value, stopping the RLF timer; when the new value of the IS counter is not greater than the sixth preset value, counting an eighteenth value of the OOS counter by using a reconfigured threshold pair criterion based on the new value of the IS counter, wherein the fourth preset proportional value is a value greater than 1;

mode 7: adding a seventh preset value to the current value of the IS counter to obtain the new value of the IS counter; when the new value of the IS counter is greater than an eighth preset value, stopping the RLF timer; when the new value of the IS counter is not greater than the eighth preset value, counting a nineteenth value of the OOS counter by using a reconfigured threshold pair criterion based on the new value of the IS counter; and mode 8: when the current value of the IS counter is higher than a second preset threshold value, stopping the RLF timer, and determining that a link is recovered; and when the current value of the IS counter is lower than the second preset threshold value, managing the IS counter, the OOS counter, and the RLF timer by using any one of the mode 1, mode 2, mode 3, mode 5, mode 6 and mode 7.

In some embodiments, the RLF timer is started based on a quantity of OOS indications consecutively reported by a lower layer, and is stopped based on a quantity of IS indications consecutively reported by the lower layer, and in response to that the RLF timer expires, a link may be determined to have failed.

An embodiment of the present application provides a computer device, including a processor, a memory, and a computer program stored in the memory and executable by the processor, wherein in response to that executing the computer program, the processor implements the followings:

determining an RLM reference signal IS/OOS monitoring threshold; and in response to that the RLM reference signal IS/OOS monitoring threshold is reconfigured, managing an IS counter, an OOS counter, and an RLF timer respectively, based on a current state of the RLF timer and a reconfiguration of an IS/OOS threshold pair.

In some embodiments, the reconfiguration of the IS/OOS threshold pair refers to that the IS/OOS threshold pair is reconfigured from a low threshold pair to a high threshold pair, or the IS/OOS threshold pair is reconfigured from a low threshold pair to a high threshold pair, wherein a threshold pair with a stricter channel quality requirement criterion is the high threshold pair, and a threshold pair with a lower channel quality requirement criterion is the low threshold pair.

In some embodiments, the processor is configured to execute the computer program to: in a case where the RLF timer is not running, when the IS/OOS threshold pair is reconfigured from a low threshold pair to a high threshold pair, manage the IS counter, the OOS counter, and the RLF timer by one of the following modes:

mode 1: retaining the OOS counter, and counting a first value of the OOS counter by using a reconfigured threshold pair criterion based on a value retained on the counter;

mode 2: resetting the OOS counter to zero, and counting a first value of the OOS counter by using a reconfigured threshold pair criterion based on a value retained on the counter;

mode 3: clearing the OOS counter and starting the RLF timer;

mode 4: rounding a first preset proportional value of a first current value of the OOS counter to obtain a first new value of the OOS counter; when the first new value of the OOS counter is greater than a first preset value, starting the RLF timer and clearing the OOS counter; when the first new value of the OOS counter is not greater than the first preset value, counting a third value of the OOS counter by using a reconfigured threshold pair criterion based on the first new value of the OOS counter, wherein the first preset proportional value is a preset value greater than 1;

mode 5: adding a second preset value to a second current value of the OOS counter to obtain a second new value of the OOS counter; when the second new value of the OOS counter is greater than a third preset value, starting the RLF timer; when the second new value of the OOS counter is not greater than the third preset value, counting a fourth value of the OOS counter by using a reconfigured threshold pair criterion based on the second new value of the OOS counter; and mode 6: when a current value of the OOS counter is higher than a first preset threshold value, starting the RLF timer, and when the current value of the OOS counter is lower than the first preset threshold value, using any one of the modes 1, 2, 4 and 5 to obtain a value of the OOS counter, and counting a fifth value of the OOS counter by using a reconfigured threshold pair criterion based on the value.

In some embodiments, the processor is configured to execute the computer program to: in a case where the RLF timer is not running, when the IS/OOS threshold pair is reconfigured from a high threshold pair to a low threshold pair, manage the IS counter, the OOS counter, and the RLF timer by one of the following modes:

mode 1: resetting the OOS counter to zero, and counting a sixth value of the OOS counter by using a reconfigured threshold pair criterion;

mode 2: retaining the OOS counter, and counting a seventh value of the OOS counter by using a reconfigured threshold pair criterion based on a value retained on the counter;

mode 3: rounding a second preset proportional value of a current value of the OOS counter to obtain a new value of the OOS counter, and performing counting an eighth value of the OOS counter by using a reconfigured threshold pair criterion based on the new value of the OOS counter, wherein the second preset proportional value is a value between 0 and 1; and mode 4: reducing a fourth preset value from a current value of the OOS counter to obtain a new value of the OOS counter, and performing counting a ninth value of the OOS counter by using a reconfigured threshold pair criterion based on the new value of the OOS counter.

In some embodiments, the processor is configured to execute the computer program to: in a case where the RLF timer is running, when the IS/OOS threshold pair is reconfigured from a low threshold pair to a high threshold pair, mange the IS counter, the OOS counter, and the RLF timer by one of the following modes:

mode 1: retaining the IS counter, and counting a tenth value of the OOS counter by using a reconfigured threshold pair criterion based on a value retained on the counter;

mode 2: retaining the IS counter, counting an eleventh value of the OOS counter by using a reconfigured threshold pair criterion, and shortening the RLF timer based on a value retained on the counter;

mode 3: resetting the IS counter to zero, and counting a twelfth value of the OOS counter by using a reconfigured threshold pair criterion;

mode 4: resetting the IS counter to zero, and stopping the RLF timer;

mode 5: resetting the IS counter to zero, and restarting or extending the RLF timer;

mode 6: rounding a third preset proportional value of a current value of the IS counter to obtain a new value of the IS counter, and performing counting a thirteenth value of the OOS counter by using a reconfigured threshold pair criterion based on the new value of the IS counter, wherein the third preset proportional value is a value between 0 and 1; and mode 7: reducing a fifth preset value from a current value of the IS counter to obtain a new value of the IS counter, and performing counting a fourteenth value of the OOS counter by using a reconfigured threshold pair criterion based on the new value of the IS counter.

In some embodiments, the processor is configured to execute the computer program to: in a case where the RLF timer is running, when the IS/OOS threshold pair is reconfigured from a high threshold pair to a low threshold pair, manage the IS counter, the OOS counter, and the RLF timer by one of the following modes:

mode 1: retaining the IS counter, and counting a fifteenth value of the OOS counter by using a reconfigured threshold pair criterion based on a value retained on the counter;

mode 2: retaining the IS counter, counting a sixteenth value of the OOS counter by using a reconfigured threshold pair criterion, and restarting or extending the RLF timer based on a value retained on the counter;

mode 3: resetting the IS counter to zero, and restarting or extending the RLF timer;

mode 4: resetting the IS counter to zero, and stopping the RLF timer;

mode 5: resetting the IS counter to zero, and counting a seventeenth value of the OOS counter by using a reconfigured threshold pair criterion;

mode 6: using a tenth preset proportional value of a current value of the IS counter as a new value of the IS counter; when the new value of the IS counter is greater than a sixth preset value, stopping the RLF timer; when the new value of the IS counter is not greater than the sixth preset value, counting an eighteenth value of the OOS counter by using a reconfigured threshold pair criterion based on the new value of the IS counter, wherein the fourth preset proportional value is a value greater than 1;

mode 7: adding a seventh preset value to the current value of the current IS counter to obtain the new value of the IS counter; when the new value of the IS counter is greater than an eighth preset value, stopping the RLF timer; when the new value of the IS counter is not greater than the eighth preset value, counting a nineteenth value of the OOS counter by using a reconfigured threshold pair criterion based on the new value of the IS counter; and mode 8: when the current value of the IS counter is higher than a second preset threshold value, stopping the RLF timer, and determining a link restoration, and when the current value of the IS counter is lower than the second preset threshold value, managing the IS counter, the OOS counter, and the RLF timer by using any one of the mode 1, mode 2, mode 3, mode 5, mode 6 and mode 7.

In some embodiments, the RLF timer is started based on a quantity of OOS indications consecutively reported by a lower layer, and is stopped based on a quantity of IS indications consecutively reported by the lower layer, and in response to that the RLF timer expires, a link may be determined to have failed.

An embodiment of the present application provides a computer-readable storage medium, which stores a computer program that executes the above-mentioned method for managing threshold pair change.

An embodiment of the present application provides an apparatus for managing threshold pair change, including:

a determination module configured to determine an RLM reference signal IS/OOS monitoring threshold; and a management module configured to, in response to that the RLM reference signal IS/OOS monitoring threshold changes, manage an IS counter, an OOS counter, and an RLF timer respectively, based on a current state of the RLF timer and the change of an IS/OOS threshold pair.

The present application has the following beneficial effects.

In the technical solution provided by the embodiments of the present application, in response to that the RLM reference signal IS/OOS monitoring threshold changes, the IS counter, the OOS counter, and the RLF timer are respectively managed based on a current state of the RLF timer and the change of an IS/OOS threshold pair. It is directed to a situation that when an RLM monitoring threshold changes, a current RLM counter and timer cannot correctly reflect the signal quality under a new channel quality requirement criterion. As the timer and counter are re-managed in conjunction with the change of the channel quality requirement and the current counter and timer states, the channel quality under a new channel quality requirement may be reflected more accurately, and thus an RLF state may be determined more accurately according to the current channel quality requirement.

BRIEF DESCRIPTION OF THE DRAWINGS

The drawings described herein are used to provide a further understanding of the present application and form a part of the present application. The exemplary embodiments of the present application and description thereof are used for illustrating rather than unduly limiting the present application. In the drawings.

DETAILED DESCRIPTION OF THE EMBODIMENTS

The inventor noticed during the invention.

An NR system uses a method for determining a link failure by reporting In-Sync indications and Out-Of-Sync indications as in an LTE system, but unlike the LTE system, the NR system has two IS/OOS BLER threshold pairs. At an initial access of the UE to a network side, a default IS/OOS threshold pair may be used to detect the link quality, and the network side may reconfigure the IS/OOS BLER threshold pair for the UE at any time according to a UE service type. Thus, there is situation as follows: a current timer and/or counter performs calculation according to a criterion 1, while a higher layer reconfigures the IS/OOS threshold to a criterion 2, and for the criterion 2, a current counter value and timer running state cannot fully and accurately reflect the requirement of the new criterion, and how to manage the RLM timer and counter has not yet been resolved.

The following description uses an IS/OOS BLER criterion 1 [2%, 10%] and criterion 2 [1%, 5%] respectively as an example. The above criteria are used as an example in the description of the present application, but the specific criteria may be modified during implementation based on a protocol result.

Figure 1:
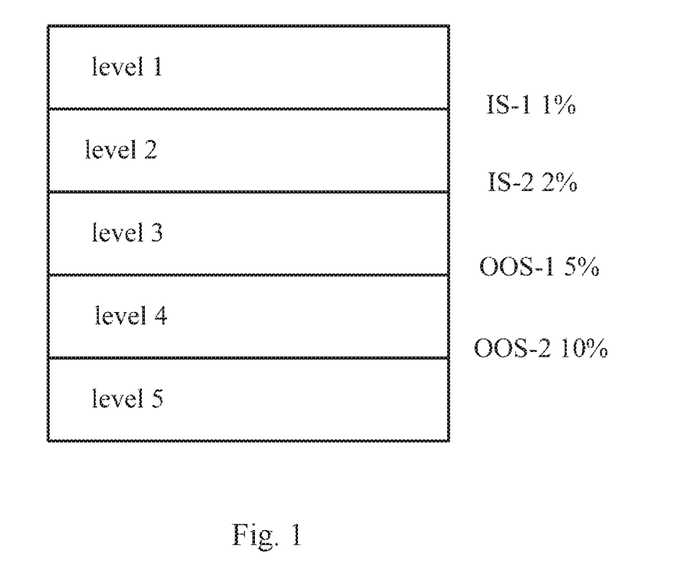
FIG. 1 is a schematic diagram of RLM threshold criteria in an embodiment of this application.

FIG. 1 is a schematic diagram of an RLM threshold criterion. As shown in FIG. 1, based on the above two pairs of IS/OOS criteria, the reference signal quality can be divided into 5 levels accordingly, wherein a BLER of lower than 1% is at a level 1, a BLER of higher than 1% and lower than 2% is at a level 2, and so on, a signal quality BLER of higher than 10% is at a level 5. The IS/OOS threshold shown is only a schematic value for convenience of description, and is not limited to the threshold value.

In the case where the UE is configured to use the criterion 1 for RLM detection, when the RLM monitoring reference signal quality is at the level 1 and the level 2, a lower layer may report an In-Sync indication to the RRC layer, and when the RLM reference signal quality is at the level 5, the lower layer reports an Out-Of-Sync indication to an RRC layer, and when the reference signal quality is at the level 3 and the level 4, the lower layer does not need to report an In-Sync indication nor an Out-Of-Sync indication to the RRC layer.

In the case where the UE is configured to use the criterion 2 for RLM detection, when the RLM monitoring reference signal quality is at the level 1, the lower layer reports an In-Sync indication to the RRC layer, and when the RLM reference signal quality is at the level 4 and the level 5, the lower layer reports an Out-Of-Sync indication to an RRC layer, and when the reference signal quality is at the level 2 and the level 3, the lower layer does not need to report an In-Sync indication nor an Out-Of-Sync indication to the RRC layer.

It can be seen that when the UE is reconfigured from the IS/OOS criterion 1 to criterion 2, a current In-Sync indication may contain a reference signal of the level 2, which does not meets the requirement of the criterion 2, and a current In-Sync counter may be greater than a counted value under the same condition with the criterion 2 as the criterion. A reference signal of the level 4 may be missed in an Out-Of-Sync indication, and a current Out-Of-Sync counter may be lower than a counted value under the same condition with the criterion 2 as the criterion. Conversely, when the UE is reconfigured from the IS/OOS criterion 2 to criterion 1, a current In-Sync indication may lack a reference signal of the level 2, and a current In-Sync counter may be less than a counted value under the same condition with the criterion 1 as the criterion. An Out-Of-Sync indication may contain a reference signal of the level 4, which does not meet the requirement of the criterion 1, and a current Out-Of-Sync counter may be higher than a counted value under the same condition with the criterion 1 as the criterion.

For a T310 timer, the consecutive reception of N310 Out-Of-Sync indications as the criterion triggers the timer to start operation, and the consecutive reception of N311 In-Sync indications as the criterion causes the timer to be stopped, so when the counter cannot accurately reflect the current signal quality, the on and off the T310 timer is also influenced to some extent.

It can be seen that in the NR system, the network can configure the IS/OOS measuring threshold pair of the RLM measuring reference signal according to the service type of the UE. In the LTE system, there is only one default IS/OOS BLER threshold, and the network side does not need to configure the RLM monitoring threshold for the UE, and the UE evaluates the link quality based on the only IS/OOS BLER threshold. In the NR system, to meet the signal quality requirements of different service types, different RLM monitoring threshold pairs, that is, IS/OOS BLER pairs, can be configured according to the service types. The threshold pair may be configured through RRC signaling, but when the monitoring threshold changes, there is no solution to the influence on the IS/OOS counter and timer that are currently running. How to manage the current timer and counter to correctly reflect the newly configured channel quality requirement is to be resolved.

Based on this, an embodiment of the present application provides a management solution when a threshold pair changes. The specific implementation of the present application is described below in conjunction with the accompanying drawings.

Figure 2:
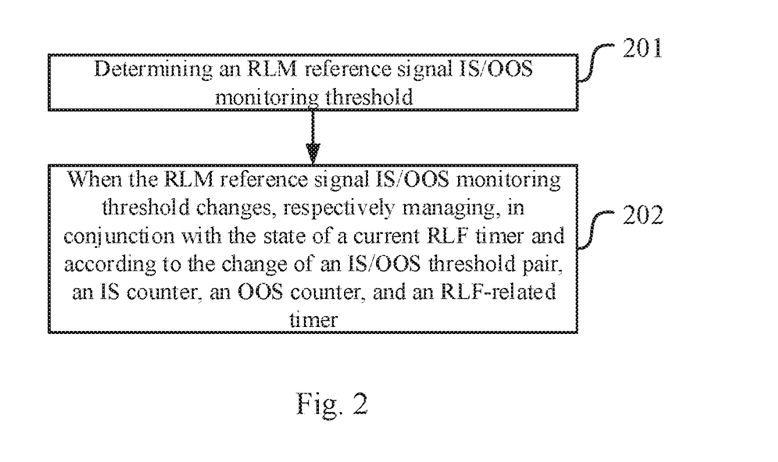
FIG. 2 is a schematic diagram of an implementation process of a method for managing a threshold pair change in an embodiment of the present application.

FIG. 2 is a schematic diagram of an implementation process of a method for management when a threshold pair changes. As shown in the figure, the method may include:

step 201: determining, by a UE, an RLM reference signal IS/OOS monitoring threshold; and step 202: when the RLM reference signal IS/OOS monitoring threshold changes, respectively managing, by the UE, based on a current state of the RLF timer and a reconfiguration of an IS/OOS threshold pair, an IS counter, an OOS counter, and an RLF timer.

In some embodiments, the radio link failure (RLF) timer is a timer that monitors a radio link state. The timer is started based on the number of Out-Of-Sync indications consecutively reported by a lower layer, and is stopped based on the number of In Syn indications consecutively reported by the lower layer, and when the timer expires, a link may be determined to have failed. In some embodiments of the timer, a T310 timer is used as an example for description. However, it is easy to understand that other timers may also be used according to changes in protocols, criteria, and actual needs.

In some embodiments, the change of the IS/OOS threshold pair refers to that the threshold pair is reconfigured from a low threshold pair to a high threshold pair, or the threshold pair is reconfigured from a high threshold pair to a low threshold pair, wherein a threshold pair with a stricter channel quality requirement criterion is a high threshold pair, and a threshold pair with a lower channel quality requirement criterion is a low threshold pair.

Specifically, when the IS/OOS threshold changes, according to the above analysis, the current IS/OOS counter can no longer correctly reflect the channel quality under the new threshold criterion, and the new threshold criterion is the new channel quality requirement. Using the IS/OOS BLER threshold pairs of [2%, 10%] and [1%, 5%] as an example, a threshold pair with a stricter channel quality requirement criterion is called a high threshold pair, that is, [1%, 5%] is a high threshold pair; and a threshold pair with a lower channel quality requirement criterion is a low threshold pair, that is [2%, 10%] is a low threshold pair. When the threshold changes from the low threshold to the high threshold, the current calculated IS counter may contain a reference signal that does not meet a high threshold IS criterion, and the OOS counter lacks a reference signal that meets a high threshold OOS criterion. That is, with the same monitoring time and under the same monitoring condition, the IS counter is greater than or equal to calculation made with the high threshold as the criterion, and the OOS counter is equal to or less than calculation made with the high threshold as the criterion; conversely, when the threshold changes from the high threshold to the low threshold, with the same monitoring time and under the same monitoring condition, the IS counter is less than or equal to calculation made with the low threshold as the criterion, and the OOS counter is greater than or equal to calculation made with the low threshold as the criterion. When the threshold changes, the UE performs different operations on the counter and the timer according to whether the T310 timer is turned on.

I. Processing when the T310 timer is not running.

When the T310 timer is not running, the UE only needs to count consecutive OOS indications, because the number of consecutive IS indications at that time cannot influence the start of the T310 timer, that is, it does not cause an RLF state. When the threshold is reconfigured from the low threshold to the high threshold, the current OOS counter lacks a reference signal that meets a high threshold OOS criterion, but it can still reflect a current OOS state to some extent; and when the threshold is reconfigured from the high threshold to the low threshold, the current OOS timer contains a reference signal that does not meet a low threshold OOS criterion. Therefore, the UE can perform the following operations.

1. When the T310 timer is not running, and the threshold pair is reconfigured from a low threshold pair to a high threshold pair, the IS counter, the OOS counter, and the RLF timer are managed by one of the following modes.

Mode 1: The OOS counter is retained, and a first value of the OOS counter is counted by using a reconfigured threshold pair criterion based on a value retained on the counter.

Mode 2: The OOS counter is reset to zero, and a second value is counted the OOS counter by using a reconfigured threshold pair criterion.

Mode 3: The OOS counter is cleared and the T310 timer is started.

Mode 4: A first proportional value of a first current value of the OOS counter is rounded to obtain a first new value of the OOS counter; if the first new value of the OOS counter is greater than a first preset value, the T310 timer is started, and the OOS counter is cleared; when the first new value of the OOS counter is not greater than the first preset value, based on the first new value of the OOS counter, a third value is counted by using a reconfigured threshold pair criterion, wherein the first proportional value is a preset value greater than 1; specifically, the first proportional value is a value greater than 1, which may be configured by the network side or specified by a protocol. The first preset value may optionally be N310 or the like.

Mode 5: A second preset value is added to a second current value of the OOS counter to obtain a second new value of the OOS counter; if the second new value of the OOS counter is greater than a third preset value, the T310 timer is started; when the second new value of the OOS counter is not greater than the third preset value, based on the second new value of the OOS counter, a fourth value of the OOS counter is counted by using a reconfigured threshold pair criterion, specifically, the added second preset value is a value configured by the network side or a value specified by a protocol, or a value calculated according to a certain principle configured by the network side or a principle specified by a certain protocol. The second preset value may optionally be N310 or the like.

Mode 6: If a current value of the OOS counter is higher than a first preset threshold value, the T310 timer is started; if the current value of the OOS counter is lower than the first preset threshold value, any one of the modes 1, 2, 4 and 5 is used to obtain a new value of the OOS counter, and based on the new value, a fifth value of the OOS counter is counted by using a reconfigured threshold pair criterion, wherein the first preset threshold value is a preset value. Specifically, the first preset threshold value may be directly configured by the network side or specified by a protocol, wherein the added certain value or certain proportional value may be configured by the network side or specified by a protocol.

2. In the cases where the T310 timer is not running, when the threshold pair is reconfigured from a high threshold pair to a low threshold pair, the IS counter, the OOS counter, and the RLF timer are managed by one of the following modes.

Mode 1: The OOS counter is reset to zero, and a sixth value is counted by using a reconfigured threshold pair criterion.

Mode 2: The OOS counter is retained, and a seventh value of the OOS counter is counted by using a reconfigured threshold pair criterion.

That is, if the number of consecutive received OOS reaches a preset value, the timer may be stopped through an IS indication, and if the current signal is really bad, a link may be determined to have failed when the T310 expires. The preset value may optionally be N310 or the like.

Mode 3: A second proportional value of a current value of the OOS counter is rounded to obtain a new value of the OOS counter, and based on the new value of the OOS counter, an eighth value of the OOS counter is counted by using a reconfigured threshold pair criterion, wherein the second proportional value is a value between 0 and 1; specifically, the second proportional value is a certain value between 0 and 1, which may be configured by the network side or specified by a protocol.

Mode 4: A fourth value is reduced from a current value of the OOS counter to obtain a new value of the OOS counter, and based on the new value of the OOS counter, a ninth value of the OOS counter is counted by using a reconfigured threshold pair criterion, wherein the fourth value is a preset value. Specifically, the reduced fourth value is a value configured by the network side or a value specified by a protocol, or a value calculated according to a principle configured by the network side or a principle specified by a protocol.

II. Processing when the T310 timer is running.

When the T310 timer is running, the UE only needs to count the consecutive IS indications, because the OOS indication at that time only influences counting by the IS counter, and the number of consecutive OOS indications cannot influence the timer and link state, but the number of consecutive IS indications influences the T310 state, thereby influencing the RLF determination. When the threshold is reconfigured from a low threshold to a high threshold, the current IS counter contains a reference signal that does not meet the high threshold; and when the threshold is reconfigured from a high threshold to a low threshold, the current IS counter lacks a reference that meets a low threshold IS criterion, but it can still reflect a current IS state to some extent, so the UE can perform the following operations.

1. When the T310 timer is running, and the threshold pair is reconfigured from a low threshold pair to a high threshold pair, the IS counter, the OOS counter, and the RLF timer are managed by one of the following modes.

Mode 1: The IS counter is retained, and a tenth value of the OOS counter is counted by using a reconfigured threshold pair criterion.

Mode 2: the IS counter is retained, an eleventh value of the OOS counter is counted by using a configured threshold pair criterion, and the T310 timer is shortened.

Mode 3: The IS counter is reset to zero, and a twelfth value of the OOS counter is counted by using a reconfigured threshold pair criterion.

Mode 4: The IS counter is reset to zero, and the T310 timer is stopped.

Mode 5: The IS counter is reset to zero, and the T310 timer is restarted or extended.

Mode 6: A third proportional value of a current value of the IS counter is rounded to obtain a new value of the IS counter, and based on the new value of the IS counter, a thirteenth value of the OOS counter is counted by using a reconfigured threshold pair criterion, wherein the third proportional value is a value between 0 and 1; specifically, the third proportional value is a certain value between 0 and 1, which may be configured by the network side or specified by a protocol.

Mode 7: A fifth preset value is reduced from a current value of the IS counter to obtain a new value of the IS counter, and based on the new value of the IS counter, a fourteenth value of the OOS counter is counted by using a reconfigured threshold pair criterion. Specifically, the reduced fifth preset value is a value configured by the network side or a value specified by a protocol, or a value calculated according to a principle configured by the network side or a principle specified by a protocol.

2. When the T310 timer is running, and the threshold pair is reconfigured from a high threshold pair to a low threshold pair, the IS counter, the OOS counter, and the RLF timer are managed by one of the following modes.

Mode 1: The IS counter is retained, and a fifteenth value of the OOS counter is counted by using a reconfigured threshold pair criterion Mode 2: The IS counter is retained, a sixteenth value of the OOS counter is counted by using a reconfigured threshold pair criterion, and the T310 timer is restarted or extended.

Mode 3: The IS counter is reset to zero, and the T310 timer is restarted or extended.

Mode 4: The IS counter is reset to zero, and the T310 timer is stopped.

Mode 5: The IS counter is reset to zero, and a seventeenth value of the OOS counter is counted by using a reconfigured threshold pair criterion.

Mode 6: A fourth preset proportional value of a current value of the IS counter is rounded to obtain a new value of the IS counter; if the new value of the IS counter is greater than a seventh preset value, the T310 timer is stopped; otherwise, based on the new value of the IS counter, an eighteenth value of the OOS counter is counted by using a reconfigured threshold pair criterion, wherein the fourth preset proportional value is a preset value greater than 1; specifically, the fourth preset proportional value is a certain value greater than 1, which may be configured by the network side or specified by a protocol. The preset value may optionally be N311 or the like.

Mode 7: A seventh preset value is added to a current value of the current IS counter to obtain a new value of the IS counter; if the new value of the IS counter is greater than an eighth preset value, the T310 timer is stopped; otherwise, based on the new value of the IS counter, a nineteenth value of the OOS counter is counted by using a reconfigured threshold pair criterion; specifically, the added seventh preset value is a value configured by the network side or a value specified by a protocol, or a value calculated according to a principle configured by the network side or a principle specified by a protocol. The preset value may optionally be N311 or the like.

Mode 8: If a current value of the IS counter is higher than a second preset threshold value, the T310 timer is stopped, and a link is considered to have recovered; otherwise, if the current value of the IS counter is lower than the second preset threshold value, the counter and the timer are managed by using any one of the modes 1, 2, 3, 5, 6 and 7, wherein the certain threshold value is a preset value. Specifically, the second preset threshold value may be configured by the network side or specified by a protocol.

The above modes may be used in any combination. That is, they can be arbitrarily combined in different states. For example, a usage scheme is that all counters are reset as long as a threshold changes, and if a timer is running, the timer is stopped. That is, in the case where the T310 is not running, when the threshold changes from a high threshold pair to a low threshold pair, a mode 1 is adopted, and when the threshold changes from a low threshold pair to a high threshold pair, a mode 2 is adopted; and in the case where the T310 is running, when the threshold changes from a high threshold pair to a low threshold pair, a mode 4 is adopted, and when the threshold changes from a low threshold pair to a high threshold pair, a combination of the mode 4 is adopted.

Furthermore, the name of the timer, the name of the counter, and the number from the counter are not limited to T310, N310, N313, equivalent RLM-related timers are all applicable, and equivalent numbers from the In-Sync and Out-Of-Sync counters are all applicable.

When the RLF timer is shortened or extended, the timer may be shortened or extended proportionally according to a certain principle, or the timer is shortened or extended by a fixed certain value. In specific implementation, a simple mode is to fixedly increase or decrease the timer by 2 s. In a complex mode, a certain algorithm may be specified by a protocol. For example, based on a ratio of a current counter value to N310/N311, the timer is increased or decreased in the same proportion.

The above-mentioned IS/OOS monitoring threshold criteria are not limited to two threshold pairs, may also be directed to multiple threshold pairs, are not limited to the criteria [1%, 5%], [2%, 10%] provided above, and are not limited to monitoring the BLER of the reference signal, and other signal quality evaluation criteria that may be used to determine the channel quality are all applicable.

Description is made below in conjunction with examples.

Embodiment 1 an implementation of configuration from a high threshold to a low threshold will be described in the embodiment.

Embodiment 1-1

The T310 is not running in the embodiment.
1) The UE monitors the current channel quality under an IS/OOS threshold 1, which is a higher threshold criterion, wherein the counted number of the OOS counter is lower than N310.
2) The network side reconfigures the UE, wherein reconfiguration message contains new IS/OOS threshold pair indication information, and a threshold 2 corresponding to the indication information is lower than the threshold 1 currently configured for the UE, that is, the threshold 2 has lower channel quality requirement than the threshold 1.
3) The UE receives signaling message containing the new IS/OOS threshold pair indication information transmitted by the network side, and changes the current threshold criterion for monitoring signal quality to the threshold 2.
4) If the current number of the OOS counter is less than N310, then the UE performs operations as follows:
4-1) resetting the OOS counter to zero, and counting a sixth value of the OOS counter by using a reconfigured threshold pair criterion; or
4-2) retaining the OOS counter, and counting a seventh value of the OOS counter by using a reconfigured threshold pair criterion based on a value retained on the counter; or
4-3) rounding a second preset proportional value of a current value of the OOS counter to obtain a new value of the OOS counter, and based on the new value of the OOS counter, counting an eighth value of the OOS counter by using a new criterion, wherein the second preset proportional value is a certain value between 0 and 1, which may be configured by the network side or specified by a protocol; or
4-4) reducing a fourth value from a current value of the OOS counter to obtain a new value of the OOS counter, and based on the new value of the OOS counter, performing counting a ninth value of the OOS counter by using a reconfigured threshold pair criterion based on the new value of the OOS counter, wherein the reduced fourth value is a value configured by the network side or a value specified by a protocol, or a value calculated according to a principle configured by the network side or a principle specified by a protocol.

Embodiment 1-2

The T310 is running in the embodiment.
1) The UE monitors the current channel quality under an IS/OOS threshold 1, which is a higher threshold criterion, wherein the counted number of the IS counter is lower than N311.
2) The network side reconfigures the UE, wherein reconfiguration message contains new IS/OOS threshold pair indication information, and a threshold 2 corresponding to the indication information is lower than the threshold 1 currently configured for the UE, that is, the threshold 2 has lower channel quality requirement than the threshold 1.
3) The UE receives signaling message containing the new IS/OOS threshold pair indication information transmitted by the network side, and changes the current threshold criterion for monitoring signal quality to the threshold 2.
4) If the number from the current IS counter is less than N311, then the UE performs operations as follows:
4-1) retaining the IS counter, and counting a fifteenth value of the OOS counter by using a reconfigured threshold pair criterion based on a value retained on the counter; or
4-2) retaining the IS counter, counting a sixteenth value of the OOS counter by using a reconfigured threshold pair criterion, and restarting or extending the T310 timer; or
4-3) resetting the IS counter to zero, and restarting or extending the T310 timer; or
4-4) resetting the IS counter to zero, and stopping the T310 timer; or
4-5 resetting the IS counter to zero, and counting a seventeenth value of the OOS counter by using a reconfigured threshold pair criterion; or 4-6) using a fourth preset proportional value of a current value of the IS counter as a new value of the IS counter, and then:

if the new value of the IS counter is greater than a sixth preset value N311, stopping the T310 timer;

otherwise, based on the new value of the IS counter, counting an eighteenth value of the OOS counter by using a reconfigured threshold pair criterion, wherein the fourth preset proportional value is a certain value greater than 1, which may be configured by the network side or specified by a protocol; or 4-7) adding a seventh preset value to a current value of the current IS counter to obtain a new value of the IS counter, and then:

if the new value of the IS counter is greater than an eighth preset value N311, stopping the T310 timer;

otherwise, based on the new value of the IS counter, counting a nineteenth value of the OOS counter by using a reconfigured threshold pair criterion, wherein the added seventh preset value is a value configured by the network side or a value specified by a protocol, or a value calculated according to a principle configured by the network side or a principle specified by a protocol; or 4-8) if a current value of the IS counter is higher than a second preset threshold value, stopping the T310 timer, and determining a link restoration; otherwise, if the current value of the IS counter is lower than the second preset threshold value, managing the counter and the timer by using any one of the modes 4-1, 4-2, 4-3, 4-5, 4-6, and 4-7, wherein the second preset threshold value may be configured by the network side or specified by a protocol.

Embodiment 2 an implementation of configuration from a low threshold to a high threshold will be described in the embodiment.

Embodiment 2-1

The T310 is not running in the embodiment.

1) The UE monitors the current channel quality under an IS/OOS threshold 2, which is a lower threshold criterion, wherein the counted number of the OOS counter is lower than N310.

2) The network side reconfigures the UE, wherein reconfiguration message contains new IS/OOS threshold pair indication information, and a threshold 1 corresponding to the indication information is higher than the threshold 2 currently configured for the UE, that is, the threshold 1 has higher channel quality requirement than the threshold 2.

3) The UE receives signaling message containing the new IS/OOS threshold pair indication information transmitted by the network side, and changes the current threshold criterion for monitoring signal quality to the threshold 1.

4) If the number from the current OOS counter is less than N310, then the UE performs operations as follows:

4-1) retaining the OOS counter, and counting a first value of the OOS counter by using a reconfigured threshold pair criterion based on a value retained on the counter; or 4-2) resetting the OOS counter to zero, and counting a second value of the OOS counter by using a reconfigured threshold pair criterion; or 4-3) clearing the OOS counter, and starting the T310 timer; or 4-4) rounding a first proportional value of a first current value of the OOS counter to obtain a first new value of the OOS counter, and then:

if the first new value of the OOS counter is greater than a first preset value N310, staring the T310 timer, and clearing the OOS counter;

otherwise, based on the first new value of the OOS counter, counting a third value of the OOS counter by using a reconfigured threshold pair criterion, wherein the first proportional value is a certain value greater than 1, which may be configured by the network side or specified by a protocol; or 4-5) adding a second preset value to a second current value of the current OOS counter to obtain a second new value of the OOS counter, and then:

if the second new value of the OOS counter is greater than a third preset value N310, starting the T310 timer;

otherwise, based on the second new value of the OOS counter, counting a fourth value of the OOS counter by using a reconfigured threshold pair criterion, wherein the added second preset value is a value configured by the network side or a value specified by a protocol, or a value calculated according to a principle configured by the network side or a principle specified by a protocol; or 4-6) if a current value of the OOS counter is higher than a first preset threshold value, starting the T310 timer; if the current value of the OOS counter is lower than the threshold value, using any one of the modes 4-1, 4-2, 4-4, and 4-5 to obtain a new value of the OOS counter, and based on the new value, counting a fifth value of the OOS counter by using a reconfigured threshold pair criterion, wherein the first preset threshold value may be directly configured by the network side or specified by a protocol, wherein the added certain value or certain proportional value may be configured by the network side or specified by a protocol.

Embodiment 2-2

The T310 is running in the embodiment.

1) The UE monitors the current channel quality under an IS/OOS threshold 2, which is a lower threshold criterion, wherein the counted number of the IS counter is lower than N311.

2) The network side reconfigures the UE, wherein reconfiguration message contains new IS/OOS threshold pair indication information, and a threshold 1 corresponding to the indication information is higher than the threshold 2 currently configured for the UE, that is, the threshold 1 has higher channel quality requirement than the threshold 2.

3) The UE receives signaling message containing the new IS/OOS threshold pair indication information transmitted by the network side, and changes the current threshold criterion for monitoring signal quality to the threshold 1.

4) If the number from the current IS counter is less than N311, then the UE performs operations as follows:

4-1) retaining the IS counter, and counting a tenth value of the OOS counter by using a reconfigured threshold pair criterion based on a value retained on the counter; or 4-2) retaining the IS counter, counting an eleventh value of the OOS counter by using a reconfigured threshold pair criterion, and shortening the T310 timer; or 4-3) resetting the IS counter to zero, and counting a twelfth value of the OOS counter by using a reconfigured threshold pair criterion; or 4-4) resetting the IS counter to zero, and stopping the T310 timer; or 4-5) resetting the IS counter to zero, and restarting or extending the T310 timer; or 4-6) rounding a third preset proportional value of a current value of the IS counter to obtain a new value of the IS counter, and based on the new value of the IS counter, counting a thirteenth value of the OOS counter by using a reconfigured threshold pair criterion, wherein the third preset proportional value is a certain value between 0 and 1, which may be configured by the network side or specified by a protocol; or 4-7) reducing a fifth preset value from a current value of the IS counter to obtain a new value of the IS counter, and based on the new value of the IS counter, counting a fourteenth value of the OOS counter by using a reconfigured threshold pair criterion, wherein the reduced fifth preset value is a value configured by the network side or a value specified by a protocol, or a value calculated according to a principle configured by the network side or a principle specified by a protocol.

Based on the same inventive concept, embodiments of the present application further provide a computer device, a computer-readable storage medium, and an apparatus for managing a threshold pair change. As the problem-solving principle of these devices is similar to that of a method for managing a threshold pair change, for the implementation of these devices, reference may be made to the implementation of the method, and the repeated description is omitted.

Figure 3:
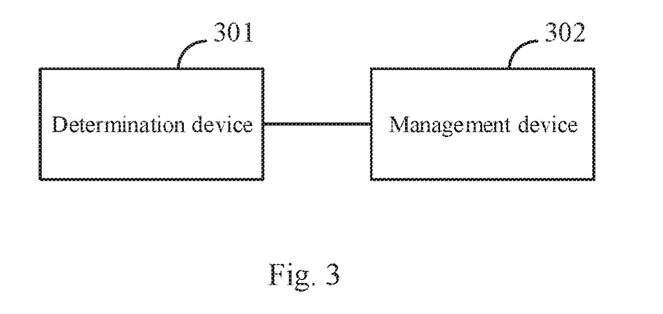
FIG. 3 is a schematic structural diagram of an apparatus for managing a threshold pair change in an embodiment of the present application.

FIG. 3 is a schematic structural diagram of an apparatus for management when a threshold pair changes. As shown in the figure, the apparatus may include:

a determination module 301 configured to determine an RLM reference signal IS/OOS monitoring threshold; and a management module 302 configured to, when the RLM reference signal IS/OOS monitoring threshold changes, respectively manage, based on a current state of the RLF timer and the change of an IS/OOS threshold pair, an IS counter, an OOS counter, and an RLF timer.

For the convenience of description, each part of the apparatus described above is divided into various modules or units according to functions and described respectively. Of course, in the implementation of the present application, the functions of the respective modules or units may be implemented in one or more software or hardware.

In the implementation of the technical solution provided by the embodiments of the present application, it may be implemented as follows.

Figure 4:
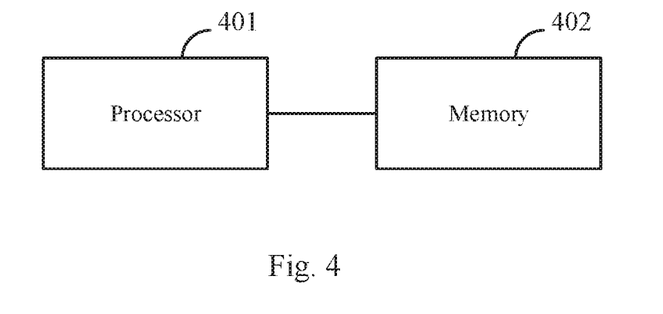
FIG. 4 is a schematic structural diagram of a computer device in an embodiment of the present application.

Referring to FIG. 4, a computer device provided by an embodiment of the present application includes: a processor 401, a memory 402, and a computer program stored in the memory 402 and executable by the processor, wherein when executing the computer program, the processor 401 implements the following method:

determining an RLM reference signal IS/OOS monitoring threshold; and when the RLM reference signal IS/OOS monitoring threshold changes, respectively managing, based on a current state of the RLF timer and the change of an IS/OOS threshold pair, an IS counter, an OOS counter, and an RLF timer.

In some embodiments, the change of the IS/OOS threshold pair refers to that the threshold pair is reconfigured from a low threshold pair to a high threshold pair, or the threshold pair is reconfigured from a low threshold pair to a high threshold pair, wherein a threshold pair with a stricter channel quality requirement criterion is a high threshold pair, and a threshold pair with a lower channel quality requirement criterion is a low threshold pair.

In some embodiments, in the cases where the RLF timer is not running, when the threshold pair is reconfigured from a low threshold pair to a high threshold pair, the IS counter, the OOS counter, and the RLF timer are managed by one of the following modes:

mode 1: retaining the OOS counter, and counting a first value of the OOS counter by using a reconfigured threshold pair criterion based on a value retained on the counter; or mode 2: resetting the OOS counter to zero, and counting an eleventh value of the OOS counter by using a reconfigured threshold pair criterion, and shortening the RLF timer based on a value retained on the counter; or mode 3: clearing the OOS counter and starting the RLF timer; or mode 4: rounding a first preset proportional value of a first current value of the OOS counter to obtain a first new value of the OOS counter; when the first new value of the OOS counter is greater than a first preset value, starting the RLF timer and clearing the OOS counter; when the first new value of the OOS counter is not greater than the first preset value, counting a third value of the OOS counter by using a reconfigured threshold pair criterion based on the first new value of the OOS counter, wherein the first preset proportional value is a value greater than 1; or mode 5: adding a second preset value to a second current value of the OOS counter to obtain a second new value of the OOS counter; when the second new value of the OOS counter is greater than a third preset value, starting the RLF timer; when the second new value of the OOS counter is not greater than the third preset value, counting a fourth value of the OOS counter by using a reconfigured threshold pair criterion based on the second new value of the OOS counter; or mode 6: when a current value of the OOS counter is higher than a first preset threshold value, starting the RLF timer, and when the current value of the OOS counter is lower than the first preset threshold value, using any one of the modes 1, 2, 4 and 5 to obtain a value of the OOS counter, and counting a fifth value of the OOS counter by using a reconfigured threshold pair criterion based on the value.

In some embodiments, in the cases where the RLF timer is not running, when the threshold pair is reconfigured from a high threshold pair to a low threshold pair, the IS counter, the OOS counter, and the RLF timer are managed by one of the following modes:

mode 1: resetting the OOS counter to zero, and counting a sixth value of the OOS counter by using a reconfigured threshold pair criterion; or mode 2: retaining the OOS counter, and counting a seventh value of the OOS counter by using a reconfigured threshold pair criterion based on a value retained on the counter; or mode 3: rounding a second preset proportional value of a current value of the OOS counter to obtain a new value of the OOS counter, and counting an eighth value of the OOS counter by using a reconfigured threshold pair criterion based on the new value of the OOS counter, wherein the second preset proportional value is a value between 0 and 1; or mode 4: reducing a fourth preset value from a current value of the OOS counter to obtain a new value of the OOS counter, and performing counting a ninth value of the OOS counter by using a reconfigured threshold pair criterion based on the new value of the OOS counter.

In some embodiments, in the case where the RLF timer is running, when the threshold pair is reconfigured from a low threshold pair to a high threshold pair, the IS counter, the OOS counter, and the RLF timer are managed by one of the following modes:

mode 1: retaining the IS counter, and counting a tenth value of the OOS counter by using a reconfigured threshold pair criterion based on a value retained on the counter; or mode 2: retaining the IS counter, counting an eleventh value of the OOS counter by using a reconfigured threshold pair criterion, and shortening the RLF timer; or mode 3: resetting the IS counter to zero, and counting a twelfth value of the OOS counter by using a reconfigured threshold pair criterion; or mode 4: resetting the IS counter to zero, and stopping the RLF timer; or mode 5: resetting the IS counter to zero, and restarting or extending the RLF timer; or mode 6: rounding a third preset proportional value of a current value of the IS counter to obtain a new value of the IS counter, and counting a thirteenth value of the OOS counter by using a reconfigured threshold pair criterion based on the new value of the IS counter, wherein the third preset proportional value is a value between 0 and 1; or mode 7: reducing a fifth preset value from a current value of the IS counter to obtain a new value of the IS counter, and counting a fourteenth value of the OOS counter by using a reconfigured threshold pair criterion based on the new value of the IS counter.

In some embodiments, in the case where the RLF timer is running, when the threshold pair is reconfigured from a high threshold pair to a low threshold pair, the IS counter, the OOS counter, and the RLF timer are managed by one of the following modes:

mode 1: retaining the IS counter, and counting a fifteenth value of the OOS counter by using a reconfigured threshold pair criterion based on a value retained on the counter; or mode 2: retaining the IS counter, counting a sixteenth value of the OOS counter by using a reconfigured threshold pair criterion, and restarting or extending the RLF timer; or mode 3: resetting the IS counter to zero, and restarting or extending the RLF timer; or mode 4: resetting the IS counter to zero, and stopping the RLF timer; or mode 5: resetting the IS counter to zero, and counting a seventeenth value of the OOS counter by using a reconfigured threshold pair criterion; or mode 6: using a fourth preset proportional value of a current value of the IS counter as a new value of the IS counter; when the new value of the IS counter is greater than a sixth preset value, stopping the RLF timer; when the new value of the IS counter is not greater than the sixth preset value, counting an eighteenth value of the OOS counter by using a reconfigured threshold pair criterion based on the new value of the IS counter, wherein the fourth preset proportional value is a value greater than 1; or mode 7: adding a seventh preset value to the current value of the IS counter to obtain the new value of the IS counter; when the new value of the IS counter is greater than an eighth preset value, stopping the RLF timer; when the new value of the IS counter is not greater than the eighth preset value, counting a nineteenth value of the OOS counter by using a reconfigured threshold pair criterion based on the new value of the IS counter; or mode 8: when the current value of the IS counter is higher than a second preset threshold value, stopping the RLF timer, and determining that a link is recovered; and when the current value of the IS counter is lower than the second preset threshold value, managing the IS counter, the OOS counter, and the RLF timer by using any one of the mode 1, mode 2, mode 3, mode 5, mode 6 and mode 7.

In some embodiments, the RLF timer is started based on the number of Out-Of-Sync indications (OOS) consecutively reported by a lower layer, and is stopped based on the number of In-Sync indications (IS) consecutively reported by the lower layer, and when the timer expires, a link may be determined to have failed.

An embodiment of the present application further provides a computer-readable storage medium, which stores a computer program that executes the above-mentioned method for management when a threshold pair changes. For the specific implementation, reference may be made to the implementation of the above-mentioned computer device.

In summary, in the technical solution provided by the embodiments of the present application, when the RLM reference signal IS/OOS monitoring threshold changes, the IS counter, the OOS counter, and the RLF timer are respectively managed based on a current state of the RLF timer and the change of an IS/OOS threshold pair.

This solution solves the problem that when an RLM monitoring threshold changes, a current RLM counter and timer cannot correctly reflect the signal quality under a new channel quality criterion. In conjunction with the change of the channel quality requirement and the current counter and timer states, the timer and counter are re-managed to more accurately reflect the channel quality under a new channel quality requirement, so that an RLF state may be determined more accurately according to the current channel quality requirement.

Those skilled in the art should understand that the embodiments of the present invention may be provided as a method, a system or a computer program product. Therefore, the present application may be in the form of an all-hardware embodiment, an all-software embodiment, or a software and hardware combined embodiment. Moreover, the present application may be in the form of a computer program product implemented on one or more computer usable storage media (including but not limited to magnetic disk memories and optical memories) containing computer usable program codes.

The present application is described with reference to the flow diagrams and/or block diagrams of the method, device (system) and computer program product according to the embodiments of the present invention. It should be understood that each process and/or block in the flow diagrams and/or block diagrams, as well as combinations of processes and/or blocks in the flow diagrams and/or block diagrams may be implemented by computer program instructions. The computer program instructions maybe provided to a processor of a general purpose computer, a special purpose computer, an embedded processor or other programmable data processing device to produce a machine, so that the instructions processed by the processor of the computer or other programmable data processing device generates a device for achieving functions specified in one or more processes of the flow diagrams and/or one or more blocks of the block diagrams.

The computer program instructions may also be stored in a computer readable memory that can instruct a computer or other programmable data processing device to operate in a specified manner, so that the instructions stored in the computer readable memory generates a manufacture containing an instruction device, wherein the instruction device achieves the functions specified in one or more processes of the flow diagrams and/or one or more blocks of the block diagrams.

The computer program instructions may also be loaded to a computer or other programmable data processing device, so that a series of operation steps are executed on the computer or other programmable data processing device to generate computer implemented processing, so that the instructions executed on the computer or other programmable data processing device provide steps for achieving functions specified in one or more processes of the flow diagrams and/or one or more blocks of the block diagrams.

Evidently, those skilled in the art can make changes and modifications to the present application without departing from the spirit and scope of the present application. Thus, the present application is also intended to encompass these changes and modifications if such changes and modifications of the present application are within the scope of the claims of the present application and equivalents thereof

What is claimed is:

1. A method for managing threshold pair change, comprising:
    determining, by an User Equipment (UE), a radio link monitor, RLM, reference signal In-Sync indication, IS/Out-Of-Sync indication, OOS, monitoring threshold; and
    in response to that the RLM reference signal IS/OOS monitoring threshold is reconfigured, managing, by the UE, an IS counter, an OOS counter, and a radio link failure, RLF timer respectively, based on a current state of the RLF timer and a reconfiguration of an IS/OOS threshold pair;
    wherein the managing, by the UE, the IS counter, the OOS counter, and the RLF timer respectively comprises:
    scheme 1: in a case that the RLF timer is not running and the IS/OOS threshold pair is configured from a low threshold pair to a high threshold pair, retaining the OOS counter, or resetting the OOS counter to zero, or increasing the OOS counter in value; and
    scheme 2: in a case that the RLF timer is not running and the IS/OOS threshold pair is configured from a high threshold pair to a low threshold pair, retaining the OOS counter, or resetting the OOS counter to zero, or decreasing the OOS counter in value; or
    scheme 3: in a case that the RLF timer is running and the IS/OOS threshold pair is configured from a low threshold pair to a high threshold pair, retaining the IS counter, or resetting the IS counter to zero, or decreasing the IS counter in value; and
    scheme 4: in a case that the RLF timer is running and the IS/OOS threshold pair is configured from a high threshold pair to a low threshold pair, retaining the IS counter, or resetting the IS counter to zero, or increasing the IS counter.

2. The method according to claim 1, wherein the reconfiguration of the IS/OOS threshold pair refers to that the IS/OOS threshold pair is reconfigured from a low threshold pair to a high threshold pair, or the IS/OOS threshold pair is reconfigured from a high threshold pair to a low threshold pair, wherein a threshold pair with a stricter channel quality requirement criterion is the high threshold pair, and a threshold pair with a lower channel quality requirement criterion is the low threshold pair.

3. The method according to claim 2, wherein in the case the scheme 1 is performed, the managing the IS counter, the OOS counter, and the RLF timer comprises one of following modes:
    mode 1: retaining the OOS counter, and counting a first value of the OOS counter by using a reconfigured threshold pair criterion based on a value retained on the counter;
    mode 2: resetting the OOS counter to zero, and counting a second value of the OOS counter by using a reconfigured threshold pair criterion;
    mode 3: clearing the OOS counter and starting the RLF timer;
    mode 4: rounding a first preset proportional value of a first current value of the OOS counter to obtain a first new value of the OOS counter; when the first new value of the OOS counter is greater than a first preset value, starting the RLF timer and clearing the OOS counter; when the first new value of the OOS counter is not greater than the first preset value, counting a third value of the OOS counter by using a reconfigured threshold pair criterion based on the first new value of the OOS counter, wherein the first preset proportional value is a value greater than 1;
    mode 5: adding a second preset value to a second current value of the OOS counter to obtain a second new value of the OOS counter; when the second new value of the OOS counter is greater than a third preset value, starting the RLF timer; when the second new value of the OOS counter is not greater than the third preset value, counting a fourth value of the OOS counter by using a reconfigured threshold pair criterion based on the second new value of the OOS counter; and
    mode 6: when a current value of the OOS counter is higher than a first preset threshold value, starting the RLF timer, and when the current value of the OOS counter is lower than the first preset threshold value, using any one of the modes 1, 2, 4 and 5 to obtain a value of the OOS counter, and counting a fifth value of the OOS counter by using a reconfigured threshold pair criterion based on the value.

4. The method according to claim 2, wherein in the case the scheme 2 is performed, the managing the IS counter, the OOS counter, and the RLF timer comprises one of following modes:
    mode 1: resetting the OOS counter to zero, and counting a sixth value of the OOS counter by using a reconfigured threshold pair criterion;
    mode 2: retaining the OOS counter, and counting a seventh value of the OOS counter by using a reconfigured threshold pair criterion based on a value retained on the counter;
    mode 3: rounding a second preset proportional value of a current value of the OOS counter to obtain a new value of the OOS counter, and counting an eighth value of the OOS counter by using a reconfigured threshold pair criterion based on the new value of the OOS counter, wherein the second preset proportional value is a value between 0 and 1; and
    mode 4: reducing a fourth preset value from a current value of the OOS counter to obtain a new value of the OOS counter, and performing counting a ninth value of the OOS counter by using a reconfigured threshold pair criterion based on the new value of the OOS counter.

5. The method according to claim 2, wherein in the case the scheme 3 is performed, the managing the IS counter, the OOS counter, and the RLF timer comprises one of following modes:

mode 1: retaining the IS counter, and counting a tenth value of the OOS counter by using a reconfigured threshold pair criterion based on a value retained on the counter;

mode 2: retaining the IS counter, counting an eleventh value of the OOS counter by using a reconfigured threshold pair criterion, and shortening the RLF timer based on a value retained on the counter;

mode 3: resetting the IS counter to zero, and counting a twelfth value of the OOS counter by using a reconfigured threshold pair criterion;

mode 4: resetting the IS counter to zero, and stopping the RLF timer;

mode 5: resetting the IS counter to zero, and restarting or extending the RLF timer;

mode 6: rounding a third preset proportional value of a current value of the IS counter to obtain a new value of the IS counter, and counting a thirteenth value of the OOS counter by using a reconfigured threshold pair criterion based on the new value of the IS counter, wherein the third preset proportional value is a value between 0 and 1; and mode 7: reducing a fifth preset value from a current value of the IS counter to obtain a new value of the IS counter, and counting a fourteenth value of the OOS counter by using a reconfigured threshold pair criterion based on the new value of the IS counter.

6. The method according to claim 2, wherein in the case the scheme 4 is performed, the managing the IS counter, the OOS counter, and the RLF timer comprises one of following modes:

mode 1: retaining the IS counter, and counting a fifteenth value of the OOS counter by using a reconfigured threshold pair criterion based on a value retained on the counter;

mode 2: retaining the IS counter, counting a sixteenth value of the OOS counter by using a reconfigured threshold pair criterion, and restarting or extending the RLF timer based on a value retained on the counter;

mode 3: resetting the IS counter to zero, and restarting or extending the RLF timer;

mode 4: resetting the IS counter to zero, and stopping the RLF timer;

mode 5: resetting the IS counter to zero, and counting a seventeenth value of the OOS counter by using a reconfigured threshold pair criterion;

mode 6: using a fourth preset proportional value of a current value of the IS counter as a new value of the IS counter; when the new value of the IS counter is greater than a sixth preset value, stopping the RLF timer; when the new value of the IS counter is not greater than the sixth preset value, counting an eighteenth value of the OOS counter by using a reconfigured threshold pair criterion based on the new value of the IS counter, wherein the fourth preset proportional value is a value greater than 1;

mode 7: adding a seventh preset value to the current value of the IS counter to obtain the new value of the IS counter; when the new value of the IS counter is greater than an eighth preset value, stopping the RLF timer; when the new value of the IS counter is not greater than the eighth preset value, counting a nineteenth value of the OOS counter by using a reconfigured threshold pair criterion based on the new value of the IS counter; and mode 8: when the current value of the IS counter is higher than a second preset threshold value, stopping the RLF timer, and determining that a link is recovered; and when the current value of the IS counter is lower than the second preset threshold value, managing the IS counter, the OOS counter, and the RLF timer by using any one of the mode 1, mode 2, mode 3, mode 5, mode 6 and mode 7.

7. The method according to claim 1, wherein the RLF timer is started based on a quantity of OOS indications consecutively reported by a lower layer, and is stopped based on a quantity of IS indications consecutively reported by the lower layer, and in response to that the RLF timer expires, a link is determined to have failed.

8. A computer device, comprising a memory, a processor, and a computer program stored in the memory and executable by the processor, wherein the processor is configured to execute the computer program to implements followings:

determining a radio link monitor, RLM, reference signal In-Sync indication, IS/Out-Of-Sync, OOS monitoring threshold;

in response to that the RLM reference signal IS/OOS monitoring threshold is reconfigured, managing an IS counter, an OOS counter, and an RLF timer respectively, based on a current state of the RLF timer and a reconfiguration of an IS/OOS threshold pair;

wherein the managing, by the UE, the IS counter, the OOS counter, and the RLF timer respectively comprises:

scheme 1: in a case that the RLF timer is not running and the IS/OOS threshold pair is configured from a low threshold pair to a high threshold pair, retaining the OOS counter, or resetting the OOS counter to zero, or increasing the OOS counter in value; and scheme 2: in a case that the RLF timer is not running and the IS/OOS threshold pair is configured from a high threshold pair to a low threshold pair, retaining the OOS counter, or resetting the OOS counter to zero, or decreasing the OOS counter in value; or scheme 3: in a case that the RLF timer is running and the IS/OOS threshold pair is configured from a low threshold pair to a high threshold pair, retaining the IS counter, or resetting the IS counter to zero, or decreasing the IS counter in value; and scheme 4: in a case that the RLF timer is running and the IS/OOS threshold pair is configured from a high threshold pair to a low threshold pair, retaining the IS counter, or resetting the IS counter to zero, or increasing the IS counter.

9. The computer device according to claim 8, wherein the reconfiguration of the IS/OOS threshold pair refers to that the IS/OOS threshold pair is reconfigured from a low threshold pair to a high threshold pair, or the IS/OOS threshold pair is reconfigured from a low threshold pair to a high threshold pair, wherein a threshold pair with a stricter channel quality requirement criterion is the high threshold pair, and a threshold pair with a lower channel quality requirement criterion is the low threshold pair.

10. The computer device according to claim 9, wherein the processor is configured to execute the computer program to: in the case the scheme 1 is performed, manage the IS counter, the OOS counter, and the RLF timer by one of following modes:

mode 1: retaining the OOS counter, and counting a first value of the OOS counter by using a reconfigured threshold pair criterion based on a value retained on the counter;

mode 2: resetting the OOS counter to zero, and counting a second value of the OOS counter by using a reconfigured threshold pair criterion;

mode 3: clearing the OOS counter and starting the RLF timer;

mode 4: rounding a first preset proportional value of a first current value of the OOS counter to obtain a first new value of the OOS counter; when the first new value of the OOS counter is greater than a first preset value, starting the RLF timer and clearing the OOS counter; when the first new value of the OOS counter is not greater than the first preset value, counting a third value of the OOS counter by using a reconfigured threshold pair criterion based on the first new value of the OOS counter, wherein the first preset proportional value is a preset value greater than 1;

mode 5: adding a second preset value to a second current value of the OOS counter to obtain a second new value of the OOS counter; when the second new value of the OOS counter is greater than a third preset value, starting the RLF timer; when the second new value of the OOS counter is not greater than the third preset value, counting a fourth value of the OOS counter by using a reconfigured threshold pair criterion based on the second new value of the OOS counter; and mode 6: when a current value of the OOS counter is higher than a first preset threshold value, starting the RLF timer, and when the current value of the OOS counter is lower than the first preset threshold value, using any one of the modes 1, 2, 4 and 5 to obtain a value of the OOS counter, and counting a fifth value of the OOS counter by using a reconfigured threshold pair criterion based on the value.

11. The computer device according to claim 9, wherein the processor is configured to execute the computer program to: in the case the scheme 2 is performed, manage the IS counter, the OOS counter, and the RLF timer by one of following modes:

mode 1: resetting the OOS counter to zero, and counting a sixth value of the OOS counter by using a reconfigured threshold pair criterion;

mode 2: retaining the OOS counter, and counting a seventh value of the OOS counter by using a reconfigured threshold pair criterion based on a value retained on the counter;

mode 3: rounding a second preset proportional value of a current value of the OOS counter to obtain a new value of the OOS counter, and performing counting an eighth value of the OOS counter by using a reconfigured threshold pair criterion based on the new value of the OOS counter, wherein the second preset proportional value is a value between 0 and 1; and mode 4: reducing a fourth preset value from a current value of the OOS counter to obtain a new value of the OOS counter, and performing counting a ninth value of the OOS counter by using a reconfigured threshold pair criterion based on the new value of the OOS counter.

12. The computer device according to claim 9, wherein the processor is configured to execute the computer program to: in the case the scheme 3 is performed, manage the IS counter, the OOS counter, and the RLF timer by one of following modes:

mode 1: retaining the IS counter, and counting a tenth value of the OOS counter by using a reconfigured threshold pair criterion based on a value retained on the counter;

mode 2: retaining the IS counter, counting an eleventh value of the OOS counter by using a reconfigured threshold pair criterion, and shortening the RLF timer based on a value retained on the counter;

mode 3: resetting the IS counter to zero, and counting a twelfth value of the OOS counter by using a reconfigured threshold pair criterion;

mode 4: resetting the IS counter to zero, and stopping the RLF timer;

mode 5: resetting the IS counter to zero, and restarting or extending the RLF timer;

mode 6: rounding a third preset proportional value of a current value of the IS counter to obtain a new value of the IS counter, and performing counting a thirteenth value of the OOS counter by using a reconfigured threshold pair criterion based on the new value of the IS counter, wherein the third preset proportional value is a value between 0 and 1; and mode 7: reducing a fifth preset value from a current value of the IS counter to obtain a new value of the IS counter, and performing counting a fourteenth value of the OOS counter by using a reconfigured threshold pair criterion based on the new value of the IS counter.

13. The computer device according to claim 9, wherein the processor is configured to execute the computer program to: in the case the scheme 4 is performed, manage the IS counter, the OOS counter, and the RLF timer by one of following modes:

mode 1: retaining the IS counter, and counting a fifteenth value of the OOS counter by using a reconfigured threshold pair criterion based on a value retained on the counter; or mode 2: retaining the IS counter, counting a sixteenth value of the OOS counter by using a reconfigured threshold pair criterion, and restarting or extending the RLF timer based on a value retained on the counter; or mode 3: resetting the IS counter to zero, and restarting or extending the RLF timer; or mode 4: resetting the IS counter to zero, and stopping the RLF timer; or mode 5: resetting the IS counter to zero, and counting a seventeenth value of the OOS counter by using a reconfigured threshold pair criterion;

mode 6: using a tenth preset proportional value of a current value of the IS counter as a new value of the IS counter; when the new value of the IS counter is greater than a sixth preset value, stopping the RLF timer; when the new value of the IS counter is not greater than the sixth preset value, counting an eighteenth value of the OOS counter by using a reconfigured threshold pair criterion based on the new value of the IS counter, wherein the fourth preset proportional value is a value greater than 1;

mode 7: adding a seventh preset value to the current value of the current IS counter to obtain the new value of the IS counter; when the new value of the IS counter is greater than an eighth preset value, stopping the RLF timer; when the new value of the IS counter is not greater than the eighth preset value, counting a nineteenth value of the OOS counter by using a reconfigured threshold pair criterion based on the new value of the IS counter; and mode 8: when the current value of the IS counter is higher than a second preset threshold value, stopping the RLF timer, and determining a link restoration, and when the current value of the IS counter is lower than the second preset threshold value, managing the IS counter, the OOS counter, and the RLF timer by using any one of the mode 1, mode 2, mode 3, mode 5, mode 6 and mode 7.

14. The computer device according to claim 8, wherein the RLF timer is started based on a quantity of OOS indications consecutively reported by a lower layer, and is stopped based on a quantity of IS indications consecutively reported by the lower layer, and in response to that the RLF timer expires, a link is determined to have failed.

15. A non-transitory computer-readable storage medium, which stores a computer program for performing the method according to claim 1.

* * * * *